United States Patent [19]
Gabbard et al.

[11] Patent Number: 6,165,402
[45] Date of Patent: Dec. 26, 2000

[54] METHOD FOR MAKING A STOPPER

[75] Inventors: Mark E. Gabbard; Timothy J. Gabbard, both of Salisbury, Md.; Joseph M. Voytilla, Pottstown, Pa.

[73] Assignee: Abbott Laboratories, Abbott Park, Ill.

[21] Appl. No.: 09/016,566

[22] Filed: Jan. 30, 1998

[51] Int. Cl.⁷ .......................... B29C 39/10; B29C 45/14
[52] U.S. Cl. ........................................ 264/255; 264/268
[58] Field of Search .................................. 264/250, 255, 264/266, 267, 268; 425/112, 120, 121, 125, 126.1, 127

[56] References Cited

U.S. PATENT DOCUMENTS

| | | |
|---|---|---|
| 2,698,272 | 12/1954 | Clapp et al. . |
| 2,777,411 | 1/1957 | Geisler .................................... 264/268 |
| 3,490,099 | 1/1970 | Smith et al. ............................. 264/268 |
| 3,505,141 | 4/1970 | Sorensen et al. ....................... 264/267 |
| 3,597,298 | 8/1971 | Stengle, Jr. ............................. 264/265 |
| 4,233,006 | 11/1980 | Panas . |
| 4,323,158 | 4/1982 | Wheaton, III et al. . |
| 4,389,271 | 6/1983 | Shandy et al. . |
| 4,398,989 | 8/1983 | Allen et al. . |
| 4,436,500 | 3/1984 | Allen et al. . |
| 4,441,621 | 4/1984 | Matukura et al. . |
| 4,512,475 | 4/1985 | Federighi . |
| 4,517,243 | 5/1985 | Sinha et al. . |
| 4,554,125 | 11/1985 | Knapp .................................... 264/266 |
| 4,846,031 | 7/1989 | Voytilla et al. . |
| 4,915,243 | 4/1990 | Tatsumi et al. . |
| 4,994,224 | 2/1991 | Itoh et al. ............................... 264/511 |
| 5,037,595 | 8/1991 | Kornelis ................................. 264/259 |
| 5,078,941 | 1/1992 | Tatsumi et al. . |
| 5,120,148 | 6/1992 | Waters et al. . |
| 5,230,149 | 7/1993 | Martin .................................... 264/250 |
| 5,234,723 | 8/1993 | Babacz . |
| 5,308,649 | 5/1994 | Babacz . |
| 5,374,314 | 12/1994 | Babacz . |
| 5,378,510 | 1/1995 | Thomas et al. . |
| 5,484,566 | 1/1996 | Gabbard . |
| 5,531,580 | 7/1996 | Bonino et al. . |
| 5,897,823 | 4/1999 | Davis et al. ............................ 264/275 |

FOREIGN PATENT DOCUMENTS

| | | |
|---|---|---|
| 0454493 | 10/1991 | European Pat. Off. . |
| 2106567 | 5/1972 | France . |
| 2071066 | 9/1981 | United Kingdom . |
| 2106084 | 4/1983 | United Kingdom . |
| 9524301 | 9/1995 | WIPO . |

OTHER PUBLICATIONS

Patent Abstracts of Japan vol. 016, No. 180 (C–0935), Apr. 30, 1992 & JP 04 022362 A (Nissho Corp).

*Primary Examiner*—Angela Ortiz
*Attorney, Agent, or Firm*—Brian R. Woodworth

[57] ABSTRACT

A method for making a stopper. The method includes the step of providing a first tool defining a first tool cavity and a second tool defining a second molding cavity. A first plug member having an upper surface and a lower surface also is provided, the upper surface of the first plug member having a concave portion. The first plug member is faced in the first cavity such that at least a portion of the lower surface of the first plug member is in contact with the first cavity. The second tool defines a hole therethrough such that the hold provides fluid contact between the second tool cavity and a point exterior to the second tool. A polymeric material is transferred through the hole defined by the second tool into the second cavity defined by the second tool and into the concave portion of the upper surface of the first plug member such that the polymeric material forms a second plug member having an upper surface and a lower surface, the upper surface of the second plug member being defined by the molding surface defined by the second tool. The first plug member and the second plug member define a stopper. The stopper is then removed form the first and second tools.

12 Claims, 4 Drawing Sheets

METHOD FOR MAKING A STOPPER

BACKGROUND OF THE INVENTION

The present invention is directed to a method for making a stopper. In particular, the present invention is directed to a method for making a stopper by providing a first stopper member having an upper surface including a concave portion. The first stopper member is positioned in a tool and a second tool is disposed over the first tool, whereupon a polymeric material is transferred through the second tool such that the polymeric material flows into the concave portion of the upper surface of the first tool.

Stoppers are typically used in the pharmaceutical industry for the purpose of providing a fluid-tight closure for a container such as a vial. Stoppers ordinarily are constructed from polymeric materials having moduli of elasticity selected such that a hypodermic syringe needle can be used to pierce the stopper for the purpose of injecting and/or withdrawing fluid from the container and such that the stopper fluidly seals the insertion channel formed by the hypodermic syringe needle when the needle is withdrawn therefrom. In this way, such stoppers maintain a fluid-tight sterility barrier between the contents of the container and the surrounding environment.

Some pharmaceutical products have characteristics that present an increased likelihood of interaction between the pharmaceutical product and the polymeric stopper. Such interaction can result in a release by the polymeric stopper of chemicals and/or particulate, thereby potentially compromising the safety and/or efficacy of the pharmaceutical product. In some cases, the resulting degradation of the stopper may be so significant as to compromise the sterile seal created by the polymeric stopper. For example, pharmaceutical products having a high pH may interact with certain rubber stoppers, thereby causing the release of chemicals and/or particulate from the stopper into the high pH pharmaceutical product. It has been found that this problem can be overcome by providing a layer of inert material, e.g., polytetrafluoroethylene, between the pharmaceutical product and the rubber material used to manufacture the stopper. The layer of inert material protects the rubber stopper from the pharmaceutical product, thereby preventing degradation of the stopper.

Processes for manufacturing laminated stoppers have been disclosed. For example, U.S. Pat. No. 4,389,271 to Shandy, et al. and U.S. Pat. No. 4,398,989 to Allen, et al. disclose methods for making polytetrafluoroethylene-laminated stoppers of the type above-discussed. The '989 patent discloses a system for making a molded article having a body portion constructed of an elastomeric material and a liner portion constructed of an inert material, the liner portion covering a portion of the peripheral surface of the body portion. The molded article is produced by bonding a layer of elastomeric material to a layer of inert material and forming a disc from the resulting laminated sheet. The disc is then placed into a molding cavity such that the layer of inert material faces the lower surface of the molding cavity. Uncured elastomeric material is then charged into the molding cavity over the top of the disc. The resulting stopper is then cured and removed from the molding cavity.

The '271 patent discloses a method in which a sheet of laminated material including an elastomeric layer and an inert layer is partially cut to form a disc. The sheet containing the partially cut discs is then positioned over a transfer plate such that the partially cut discs are in registry with openings in the transfer plate. The transfer plate then is positioned over a plurality of molding cavities such that the openings in the transfer plate are in registry with the molding cavities. The discs are then completely severed from the sheet and transferred through the openings in the transfer plate and into the molding cavities. Uncured elastomeric material is then charged into the molding cavities over the top of the discs. The resulting stoppers are then cured and removed from the molding cavities.

One drawback in producing laminated stoppers in accordance with the methods disclosed in the '989 and '271 patents is that uncured elastomeric material charged into the molding cavity containing the disc tends to flow between the molding cavity and the inert surface of the disc. As a result, a portion of the inert material may be coated with a layer of the elastomeric material after the resulting stopper is cured. When the stopper is used to seal a pharmaceutical container, the elastomeric material will be exposed to the pharmaceutical product, thereby creating a possibility for interaction between the elastomeric material of the stopper and the pharmaceutical product.

SUMMARY OF THE INVENTION

The present invention provides a method for making a stopper. In a first embodiment of the method of the present invention, a first stopper member having an upper surface defining a concave portion is provided. The first stopper member is placed in a first tool cavity of a first tool such that a lower surface of the first stopper member is in contact with the first cavity. A second tool defining a second tool cavity is provided and positioned over the first tool. The second tool defines a hole therethrough such that the second tool cavity is in fluid communication with an external environment of the second tool. A polymeric material is then transferred through the hole defined by the second tool such that the polymeric material enters the concave portion of the upper surface of the first stopper member and such that the polymeric material takes the shape of the second tool cavity to form a second stopper member in contact with the first stopper member. The first and second stopper members form a stopper. The resulting stopper is then removed from the first and second tools.

In a second embodiment of the present invention, a lower molding tool and an upper molding tool defining respective molding surfaces and molding cavities are provided. The molding surface of the upper molding tool includes a convex portion. A sheet of polymeric material also is provided. The sheet of polymeric material is placed over the cavity defined by the lower molding tool. Relative motion is provided between the upper and lower molding tools such that the sheet of polymeric material is molded therebetween to form a first plug member having an upper surface defined by the molding surface of the upper molding tool and a lower surface defined by the lower molding tool. The upper surface of the first plug member includes a concave portion defined by the convex portion of the upper molding tool. Relative movement is then provided between the upper and lower molding tools in order to move the upper molding tool away from the lower molding tool. A third tool defining a molding surface is then provided such that the tool cavity defined by the tool faces the upper surface of the first plug member. The third provided tool defines a hole therethrough such that its tool cavity is in fluid communication with an external environment of the tool through the hole. A polymeric material is then transferred through the hole defined by the third provided tool such that the polymeric material enters the concave portion of the upper surface of the first stopper member and such that the polymeric material takes the shape of the tool cavity to form a second stopper member in contact with the first stopper member. The first and second stopper members together form a stopper. The resulting stopper is then removed from the lower molding tool and the third provided tool.

In a third embodiment of the present invention, a lower molding tool and an upper molding tool defining respective molding surfaces are provided. The molding surface of the upper molding tool includes a convex portion. In addition, a sheet of polymeric material is provided. The sheet of polymeric material is placed over a cavity defined by the lower molding tool. Relative motion is provided between the upper and lower molding tools such that the sheet of polymeric material is molded therebetween to form a first plug member having an upper surface defined by the molding surface of the upper molding tool and a lower surface defined by the lower molding tool. The upper surface of the first plug member includes a concave portion defined by the convex portion of the upper molding tool. Relative movement is then provided to the upper and lower molding tools so as to move the upper molding tool away from the lower molding tool. The first stopper member is removed from the upper and lower molding tools. A third molding tool defining a third molding tool cavity is provided and the first stopper member is placed in the third molding tool cavity such that a lower surface of the first stopper member is in contact with the third molding tool. A fourth molding tool defining a fourth molding tool cavity is provided and positioned over the third molding tool. The fourth molding tool defines a hole therethrough such that the fourth molding tool cavity is in fluid communication with an external environment of the fourth molding tool through the hole. A polymeric material is then transferred through the hole defined by the fourth molding tool such that the polymeric material enters the concave portion of the upper surface of the first stopper member and such that the polymeric material takes the shape of the fourth molding tool cavity to form a second stopper member in contact with the first stopper member. The first and second stopper members form a stopper. The resulting stopper is then removed from the third and fourth molding tools.

BRIEF DESCRIPTION OF THE DRAWINGS

For a more complete understanding of the present invention, reference may be had to the following Detailed Description read in connection with the accompanying drawings in which.

DETAILED DESCRIPTION

The present invention is directed to a method for making a stopper used to fluidly sealing a container. Although the present invention will be discussed herein in the context of making a stopper for use with a pharmaceutical vial, it will be appreciated that stoppers constructed in accordance with the present invention can be used to seal a variety of container types.

The present invention is described herein with reference to the accompanying figures. Terms of reference such as "upper" and "lower" are used to facilitate an understanding of the present invention in view of the accompanying figures. These terms are not intended to be limiting and one of ordinary skill in the art will recognize that the present invention can be practiced in a variety of spatial orientations without departing from the spirit and scope of the present invention.

Figure 1:
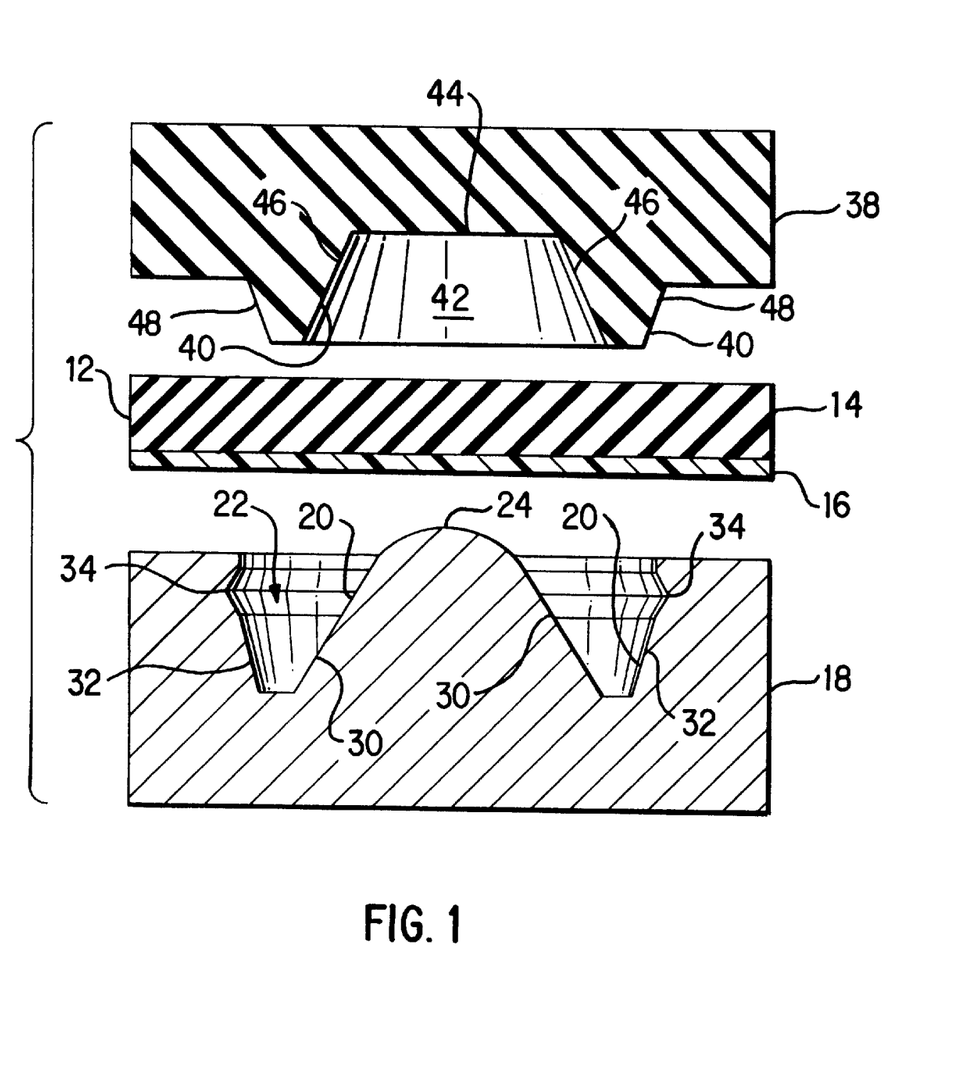
FIG. 1 is a cross-sectional view of an upper molding tool and a lower molding tool constructed in accordance with the present invention, a sheet of polymeric material being positioned between the upper molding tool and the lower molding tool.

In accordance with the present invention, a sheet 12 of polymeric material is provided, as depicted in FIG. 1. As used herein, the term "polymeric" is intended to include, but not be limited to, all substances having the properties of natural, reclaimed, unvulcanized, and/or synthetic rubber. The term "polymeric" is further intended to include any material that is useful as a plug for fluidly sealing containers so long as such material can be molded in accordance with the method of the present invention. Sheet 12 can be constructed from a single layer of polymeric material or can be constructed from a plurality of layers. In the embodiment of the present invention depicted in FIG. 1, sheet 12 includes first layer 14 constructed of a rubber material and second layer 16 constructed from an inert material. First layer 14 can be constructed of a variety of known rubber materials, including, but not limited to, butyl, ethylene propylene diene monomer ("EPDM"), isoprene, and/or butadiene rubber materials. As used herein, the term "inert" is intended to include any substance or material that is highly resistant to chemical or physical action, e.g., a fluoropolymer film. Examples of fluoropolymer films useful as second layer 16 include, but are not intended to be limited to, (a) a copolymer of tetrafluoroethylene and ethylene, e.g., TEFZEL® film sold by DuPont Films, and polytetratfluoroethylene.

In one embodiment of the present invention, sheet 12 has a total thickness of approximately 0.022–0.105 inches, with first layer 14 having a thickness of approximately 0.020–0.090 inches and second layer 16 having a thickness of approximately 0.002–0.015 inches. However, it will be appreciated by one of ordinary skill in the art that the thickness of sheet 12, first layer 14, and second layer 16 can be varied depending upon the desired characteristics of the stopper constructed in accordance with the present invention without departing from the spirit and scope of the invention claimed herein.

First layer 14 and second layer 16 of sheet 12 are provided such they are in contact with one another. For example, first layer 14 and second layer 16 can be passed through a calendaring roller prior to use in accordance with the method of the present invention. It is preferable that first layer 14 and second layer 16 be provided such that there is little or no relative movement therebetween during processing in accordance with the method of the present invention. For example, second layer 16 can be etched using known processes prior to the time that it is brought into physical contact with first layer 14. The etching of second layer 16 will inhibit relative movement between first layer 14 and second layer 16. One of ordinary skill in the art will recognize that other known methods for preventing relative movement between first layer 14 and second layer 16, e.g., bonding, can be used in accordance with the method of the present invention.

Figure 6:
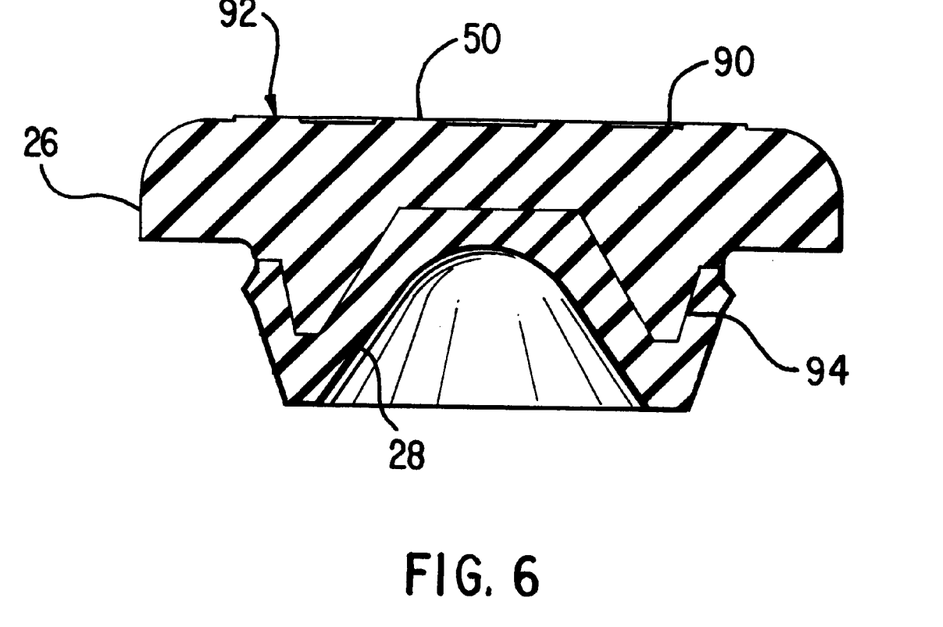
FIG. 6 is a cross-sectional view of a plug constructed in accordance with the present invention.

Lower molding tool 18 also is provided in accordance with the method of the present invention. Lower molding tool 18 defines a molding surface 20 which, in turn, defines lower molding tool cavity 22. Lower molding tool 18 can be constructed of a variety of materials known to be useful in the molding of elastomeric and/or polymeric materials such as rubber. For example, lower molding tool 18 can be constructed of a metal material, e.g, stainless steel. As depicted in FIG. 1, lower molding tool cavity 22 is substantially circular and is used to make a stopper that is substantially circular, as depicted in FIG. 6. However, it will be appreciated that the particular configuration of lower molding tool cavity 22 and molding surface 20 of lower molding tool 18 will be contingent upon the shape of the container that is to be plugged using a stopper constructed in accordance with the method of the present invention. For example, if the mouth of the container is rectangular, a plug constructed in accordance with the present invention will preferably be rectangular in shape. Accordingly, lower molding tool cavity 22 preferably will have a shape that corresponds to the shape of the container opening to be plugged.

Molding surface 20 defined by lower molding tool 18 includes a central portion 24. In the embodiment of the invention depicted in FIG. 1, central portion 24 is convex in shape. It will be appreciated that a stopper 24 constructed using a lower molding tool 18 having a central portion 24 that is convex in shape will produce a stopper 26 having a lower surface 28 that is concave in shape, as depicted in FIG. 6. It also will be appreciated that central portion 24 can be substantially planar or concave, or combinations of convex, planar, and/or concave, without departing from the spirit and scope of the present invention.

Molding surface 20 defined by lower molding tool 18 further includes a first leg portion 30 extending radially outwardly and downwardly from central portion 24. In addition, molding surface 20 includes a second leg portion 32 extending radially outwardly and upwardly from first leg portion 30, as depicted in FIG. 1. Second leg portion 32 defines a convex portion 34 therein, as depicted in FIG. 1.

Lower molding tool 18 can be provided as a single tool as depicted in FIG. 1. Alternatively, a plurality of lower molding tools 18 can be provided in an array and associated with an assembly machine or system in order to produce simultaneously a plurality of parts in accordance with the method of the present invention. For the sake of clarity, the method of the present invention will be described herein in the context of making a single stopper 26. This description is not intended to be limiting.

Upper molding tool 38 also is provided in accordance with the method of the present invention. Upper molding tool 38 defines a molding surface 40 which defines upper molding tool cavity 42. Upper molding tool 38, like lower molding tool 18, can be constructed of a variety of materials known to be useful in the molding of elastomeric and/or polymeric materials. As depicted in FIG. 1, upper molding tool cavity 42 is substantially circular and is used to make a stopper that is substantially circular. However, it will be appreciated that the particular configuration of upper molding tool cavity 42 and molding surface 40 of upper molding tool 38 will be contingent upon the shape of the container that is to be plugged using a stopper constructed in accordance with the method of the present invention, as above-discussed with respect to lower molding tool 18. Further, molding surface 40 of upper molding tool 38 and molding surface 20 of lower molding tool 18 should be complementary, as described in greater detail herein.

Molding surface 40 defined by upper molding tool 38 includes a central portion 44. In the embodiment of the invention depicted in FIG. 1, central portion 24 is substantially planar. It will be appreciated that central portion 44 can be substantially convex or concave, or combinations thereof, without departing from the spirit and scope of the present invention.

Molding surface 40 defined by upper molding tool 38 further includes a first leg portion 46 extending radially outwardly and downwardly from central portion 44. In addition, molding surface 40 includes a second leg portion 48 extending radially outwardly and upwardly from first leg portion 46, as depicted in FIG. 1. First leg portion 46 and second leg portion 48 of upper molding tool 38 define a convex structure, also as depicted in FIG. 1.

Figure 2:
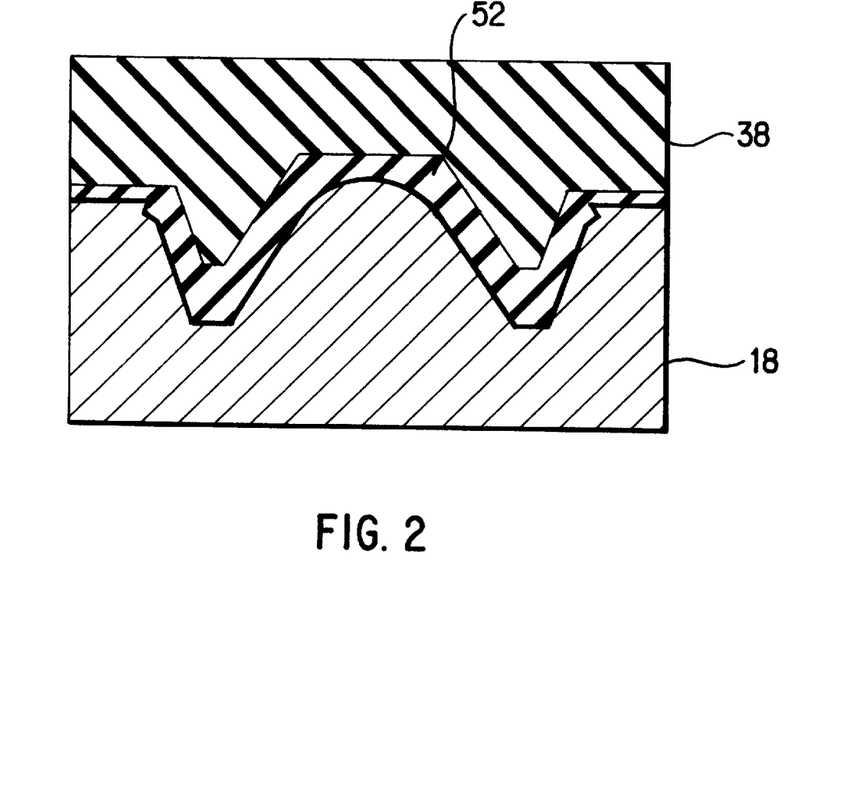
FIG. 2 is a cross-sectional view of a sheet of polymeric material compression molded between the upper molding tool and lower molding tool of the present invention.
Figure 3:
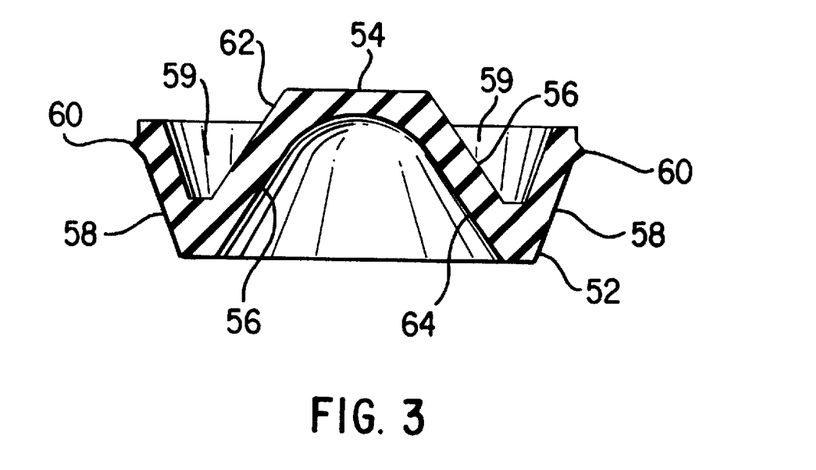
FIG. 3 is a cross-sectional view of a first plug member constructed in accordance with the method of the present invention.

Sheet 12 is positioned over lower molding tool cavity 22 as depicted in FIG. 1. Upper molding tool 38 is positioned on a side of sheet 12 opposite to that of lower molding tool 18 such that upper molding tool cavity 42 faces lower molding tube cavity 22. Inert layer 16 of sheet 12 is positioned such that it faces lower molding tool cavity 22, as depicted in FIG. 1. Relative movement is provided between upper molding tool 38 and lower molding tool 18 such that molding surface 20 of lower molding tool 18 and molding surface 40 of upper molding tool 38 are moved toward one another, thereby compressing sheet 12 therebetween, as depicted in FIG. 2. Compression of sheet 12 between lower molding tool 18 and upper molding tool 38 produces first plug member 52, as depicted in FIG. 3.

It will be appreciated that numerous known devices can be used in order to impart relative movement between upper molding tool 38 and lower molding tool 18. For example, molding equipment of known construction and operation can be reconfigured to include lower molding tool 18 and upper molding tool 38 in accordance with the present invention. Manual, hydraulic, mechanical, and electromechanical systems can be used to impart the desired relative movement between upper molding tool 38 and lower molding tool 18.

Molding of sheet 12 is facilitated by applying a vacuum or negative pressure thereto as sheet 12 is molded between lower molding tool 18 and upper molding tool 38. Techniques and systems for applying vacuum pressures during molding are well known in the art. For example, as lower molding tool 18 and upper molding tool 38 are moved toward one another, a vacuum-forming shroud (not shown) can be positioned about the peripheries of lower molding tool 18 and upper molding tool 38 such that a substantially fluid-tight seal is formed between an external environment and an interior space defined between lower molding tool 18 and upper molding tool 38. It is preferable that this seal be created and that the vacuum pressure be applied prior to moving lower molding tool 18 and upper molding tool 38 into their respective molding positions. Upon the application of the desired vacuum pressure, lower molding tool 18 and upper molding tool 38 can be moved into their respective molding positions, thereby compressing sheet 12 therebetween.

Molding of sheet 12 between lower molding tool 18 and upper molding tool 38 occurs as a result of the pressure created therebetween. It will be appreciated that the pressure required to molding sheet 12 will be dependent upon a number of variables, including the thickness and material characteristics of sheet 12.

Lower molding tool 18 and/or upper molding tool 38 can be constructed such that they apply heat to sheet 12 during the molding thereof. Known systems for heating the upper and lower molding tools can be used.

The pressure, temperature, and time during which sheet 12 is molded between lower molding tool 18 and upper molding tool 38 are preferably preprogrammed into a central processing unit which controls operation of lower molding tool 18, upper molding tool 38, and the device or system used to provide relative movement therebetween. Known devices and systems can be used to perform this function. In the alternative, operation of lower molding tool 18, upper molding tool 38, and the device or system used to provide relative movement between lower molding tool 18 and upper molding tool 38, can be performed manually without departing from the spirit and scope of the present invention.

As above-discussed, the molding of sheet 12 between lower molding tool 18 and upper molding tool 38 produces first plug member 52. First plug member is formed as a result of the complementary features of molding surface 20 of lower molding tool 18 and molding surface 40 of upper molding tool 38. First plug member 52, as depicted in FIG. 3, includes a central portion 54, a first leg portion 56 extending radially outwardly and downwardly from central portion 54, and a second leg portion 58 extending radially outwardly and upwardly from first leg portion 56. Upper surface 62 of first plug member 52 is formed by upper molding tool 38 while lower surface 64 of first plug member 52 is formed by lower molding tool 18. Lower surface 64 of first plug member 52 ultimately defines lower surface 28 of stopper 26, as described in detail herein. A concave portion 59 is defined on upper surface 62 between first leg portion 56 and second leg portion 58 of first plug member 52, as depicted in FIG. 3. Concave portion 59 of first plug member is created by the convex structure defined by first leg portion 46 and second leg portion 48 of upper molding tool 38. In the embodiment of the present invention constructed to produce stoppers for sealing circular openings, concave portion 59 preferably is annular and is spaced inwardly from the perimeter of upper surface 62. The importance of concave portion 59 will be discussed in detail below.

Annular shoulder 60 is defined on second leg portion 58 of first plug member 52 as depicted in FIG. 3. Annular shoulder 60 is formed by convex portion 34 of second leg portion 32 of lower molding tool 18.

After sheet 12 has been molded between lower molding tool 18 and upper molding tool 38, relative movement is provided to lower molding tool 18 and upper molding tool 38 so as to move them away from one another, thereby providing access to first plug member 52. As above-discussed, known devices and systems can be used to effect relative movement between lower molding tool 18 and upper molding tool 38.

In a first embodiment of the present invention, first plug member 52 is removed from lower molding tool. Removal of first plug member 52 from lower molding tool 18 can be performed manually or through the use of known devices and systems for removing parts from molds.

Due to the manner in which first plug member 52 is formed from sheet 12, first plug member 52 likely will have residual polymeric material from sheet 12 about its periphery after it is removed from lower molding tool 18. If a plurality of first plug members 52 are formed simultaneously in an array of lower molding tools 18 and upper molding tools 38, the residual polymeric material will tend to be in the form of a sheet of material extending between and interconnecting individual first plug members 52. The residual material will facilitate removal of first plug members 52 from an array of upper and lower molding tools. The residual polymeric material is preferably cut or die trimmed from first plug member 52 such that first plug member 52 looks substantially as depicted in FIG. 3. Die trimming can be conducted using a variety of known manual and automated cutting methods and systems.

Figure 4:
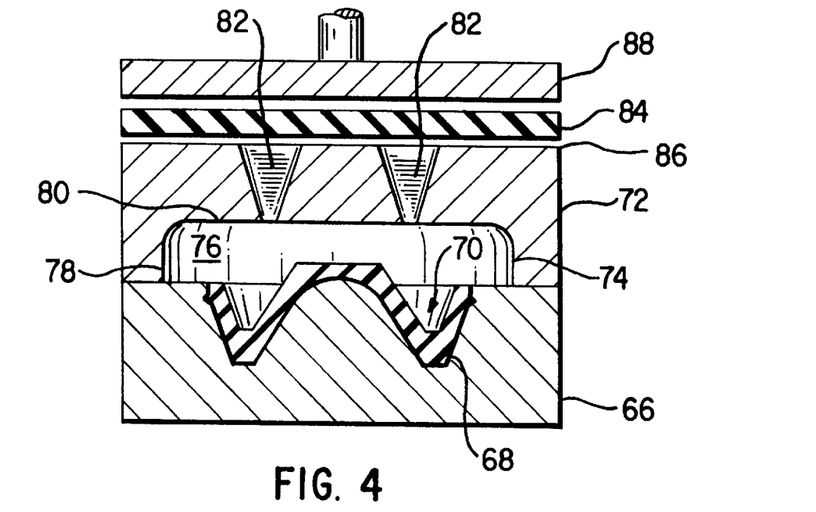
FIG. 4 is a cross-sectional view of a third molding tool and a fourth molding tool constructed in accordance with the present invention, the first plug member being positioned in the third molding tool and a sheet of polymeric material being positioned between the fourth molding tool and a transfer piston also depicted in cross-section.

In the first embodiment of the present invention, a third tool 66 is provided. Third tool 66 defines a surface 68 which in turn defines third tool cavity 70, as depicted in FIG. 4. Third tool molding cavity 70 preferably is substantially the same in both size and shape as lower molding tool cavity 22.

In the first embodiment of the present invention, first plug member 52 is placed in third tool molding cavity 70 such that lower surface 64 of first plug member 52 is in contact with third tool surface 68, as depicted in FIG. 4.

A fourth tool 72 depicted in FIG. 4 also is provided. Fourth tool 72 defines a molding surface 74 which in turns defines a molding cavity 76. Fourth tool 72 preferably is provided such that fourth tool molding cavity 76 is directed toward third molding cavity 70 and upper surface 62 of first plug member 52 as depicted in FIG. 4.

Depending upon the relative positions of third tool 66 and fourth tool 72, it may be necessary to impart relative movement therebetween in order to conduct molding therebetween. Third tool 66 and fourth tool 72 are depicted in FIG. 4 as being in contact with one another when molding is being conducted therebetween. However, it will be appreciated that a space or gap can be present between third tool 66 and fourth tool 72 without departing from the spirit and scope of the present invention. Relative movement between third tool 66 and fourth tool 72 can be provided by known manual, hydraulic, mechanical, and electromechanical devices and systems as above-discussed with respect to lower molding tool 18 and upper molding tool 38.

Fourth tool 72 includes a peripheral, substantially vertical wall portion 78 and an upper, substantially horizontal wall portion 80, as depicted in FIG. 4. Fourth tool 72 defines at least one sprue hole 82 therethrough. In the embodiment of the present invention depicted in FIG. 4, four (4) sprue holes 82 are defined through upper wall portion 80 of fourth tool 72. Sprue holes 82 provide therethrough fluid communication between fourth tool molding cavity 76 and an external environment of fourth tool 72.

Upper wall portion 80 of fourth tool 72 can be constructed such that it imparts a variety of surface characteristics to upper surface 50 of stopper 26. For example, a pattern of annular recesses can be formed in upper wall portion 80 in order to create a pattern of ridges on upper surface 50 of stopper 26. Other patterns and symbols, including trademarks and alphanumeric symbols, can be imparted to upper surface 50 of stopper 26 by providing a complementary pattern on upper wall portion 80.

In accordance with the method of the present invention, a polymeric material is transferred through one or more sprue holes 82 defined through fourth tool 72 such that the polymeric material moves into concave portion 59 of first plug member 52 and such that the polymeric material is moved into fourth tool molding cavity 76. A variety of known rubber materials can be used in connection with this step of the present invention, including, but not limited to, butyl, ethylene propylene diene monomer ("EPDM"), isoprene, and/or butadiene rubber materials, the same materials used to form layer 14.

Polymeric material can be transferred through sprue holes 82 using a variety of known techniques. In one embodiment of the present invention, a polymeric material such as one or more of the above-referenced rubber materials is transferred through sprue holes 82 by placing a sheet 84 of the polymeric material on upper surface 86 of fourth tool 72. A tool such as transfer piston 88 is positioned in the manner depicted in FIG. 4 for the purpose of imparting a downward force on sheet 84 such that a portion of the material of sheet 84 is forced through sprue holes 82 and into fourth tool molding cavity 76. The magnitude of the force required to transfer material from sheet 84 through sprue holes 82 will be dependent upon a variety of factors including the characteristics of the material of sheet 84. Operation of transfer piston 88 can be performed manually, hydraulically, mechanically, or electromechanically using known devices and systems. This operation is preferably conducted so that the pressure imparted by transfer piston 88 on sheet 84 is maintained within desirable parameters. Again, the desirable parameters will be dependent upon factors such as the characteristics of sheet 84.

It will be appreciated that other known methods for transferring material through sprue holes 82 and into fourth tool molding cavity 76 can be used without departing from the spirit and scope of the present invention. For example, liquified polymeric material can be poured or injected through sprue holes 82 and into fourth tool molding cavity 76 using known techniques.

As material is transferred through sprue holes 82 and into fourth tool molding cavity 76 the material preferably flows directly into concave portion 59 of first plug member 52, concave portion 59 being defined between first leg portion 56 and second leg portion 58. As concave portion 59 is filled with material from sheet 84, second leg portion 58 of first plug member 52 will be urged radially outwardly toward third tool surface 68 due to a radially outwardly directed force created by the material from sheet 84. The resulting engagement between second leg portion 58 and third tool surface 68 creates a flow barrier therebetween, thus minimizing the possibility that material transferred through sprue holes 82 will flow over lower surface 64 of first plug member 52.

When the method of the present invention is practiced using a sheet 12 having a second layer 16 constructed of an inert material such as a fluoropolymer film, the inert material forms lower surface 64 of first plug member 52. Due to the presence of concave portion as above-discussed, polymeric material introduced through sprue holes 82 will not tend to flow beyond annular shoulder 60, thereby ensuring that the inert material on lower surface 64 of first plug member 52 beyond annular shoulder 60 will not be coated by the polymeric material from sheet 84 as it is transferred into fourth tool molding cavity 76. This ensures that the portion of lower surface 28 of stopper 26 that is exposed to the contents of a container with which stopper 26 is used will be constructed only of the inert material. As above-discussed, the presence of non-inert polymeric material on lower surface 64 may give rise to undesirable results such as the release of extractables from the non-inert polymeric material into a pharmaceutical product contained in a vial with which the stopper is used.

Figure 5:
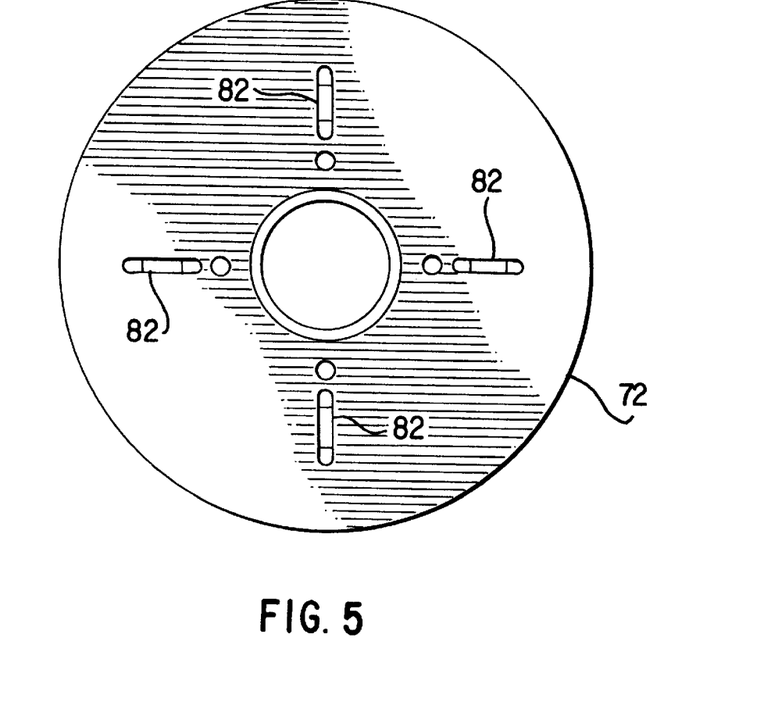
FIG. 5 is a top view of a fourth molding tool constructed in accordance with the present invention.

In order to enhance the above-discussed seal between annular shoulder 60 and fourth tool 72, sprue holes 82 can be positioned such that they transfer material directly into concave portion 59 of first plug portion 52, that is such that sprue holes 82 are positioned directly above concave portion 59 as depicted in FIGS. 4 and 5. In addition, it will be appreciated that sprue holes 82 can be formed such that material transferred therethrough will impinge on upper surface 62 of second leg portion 58, thereby increasing the radially outward force exerted on second leg portion 58 and increasing the efficacy of the flow barrier between second leg portion 58 and third tool 66. It will be appreciated that the present invention is not limited to the use of four sprue holes as depicted in FIG. 5.

Material from sheet 84 transferred into fourth molding tool cavity 76 forms second plug member 90. Second plug member 90 is in direct contact with upper surface 62 of first plug member 52. Second plug member 90 includes an upper surface 92 and a lower surface 94. Upper surface 92 of second plug member 90 forms upper surface 50 of stopper 26. As above-discussed, upper surface 92 can be formed such that it includes ridges, trademarks, and alphanumeric symbols. Lower surface 94 of second plug member 90 conforms to the shape of upper surface 62 of first plug member 52. When constructed in accordance with the method of the present invention, first plug member 52 and second plug member 90 become a single entity, i.e., stopper 26, thereby making it extremely difficult to distinguish between first plug member 52 and second plug member 90. FIG. 6 depicts a border between first plug member 52 and second plug member 90 only for the purposes of facilitating an understanding of the present invention.

Stopper 26 can be removed from third tool 66 and fourth tool 72 using a variety of known techniques. For example, relative movement can be provided between third tool 66 and fourth tool 72 in order to provide direct access to stopper 26. Manual, mechanical, hydraulic, or electromechanical removal of stopper 26 from third tool 66 and fourth tool 72 can then be performed using known devices and systems. Alternatively, third tool 66 and/or fourth tool 72 can be constructed such that stopper 26 can be removed therefrom without providing relative movement therebetween. For example, fourth tool 72 can be constructed such that molding surface 74 is movable away from third tool 66, thereby providing direct access to stopper 26.

Stopper 26 preferably is cured using known curing procedures which form no part of the present invention. Curing can be performed while stopper 26 is in third tool 66 and fourth tool 72, or can be performed after stopper 26 has been removed therefrom.

It will be appreciated that stopper 26 will have residual polymeric material from sheet 84 about its periphery after it is removed from third tool 66 and fourth tool 72 in accordance with the method of the present invention. In particular, residual polymeric material will be present proximal the point on the periphery of stopper 26 where third tool 66 and fourth tool 72 meet during the transfer of polymeric material into fourth tool molding cavity 76. In addition, residual polymeric material may be present at the position where polymeric material was introduced through the sprue holes 82 into fourth molding tool cavity 76 to create second plug member 90. The residual polymeric material is preferably cut or die trimmed from stopper 26 such that stopper 26 looks substantially as depicted in FIG. 6. Die trimming can be performed using a variety of known manual and automated cutting methods and systems.

As above-discussed, the shape of third tool surface 68 is substantially the same as the shape of molding surface 20 of lower molding tool 18. For this reason, it is possible to produce plug 26 without removing first plug member 52 from lower molding tool 18. Thus, in a second embodiment of the method of the present invention, lower molding tool 18 is used in lieu of third tool 66. In this embodiment, first plug member 52 remains in lower molding tool 18 after it is formed rather than being moved to third molding tool 66. After formation of first plug member 52 using lower molding tool 18 and upper molding tool 38, the remaining steps for forming stopper 26 are the same as above-discussed, with the exception that lower molding tool 18 is used in lieu of third tool 66.

Although the present invention has been described herein with reference to certain preferred embodiments, it will be understood that various modifications to the present invention can be made without departing from its intended spirit and scope which is defined by the appended claims.

What is claimed is:

1. A method for making a stopper, said method comprising the steps of:

providing a first tool defining a first tool cavity;

providing a first plug member having an upper surface and a lower surface, said upper surface having a concave portion;

placing said first plug member in said first cavity defined by said first tool such that at least a portion of said lower surface of said first plug member is in contact with said first cavity;

providing a second tool defining a molding surface, said molding surface defined by said second tool defining a second tool cavity, said second tool defining a hole therethrough, said hole providing fluid contact between said second tool cavity and a point exterior to said second tool, said second tool oriented such that said second tool cavity faces said first tool cavity;

transferring a polymeric material through said hole defined by said second tool into said second cavity defined by said second tool and into said concave portion of said upper surface of said first plug member, said polymeric material forming a second plug member having an upper surface and a lower surface, a shape of said upper surface of said second plug member being defined by said molding surface defined by said second tool, a portion of said lower surface of said second plug member being in contact with said upper surface of said first plug member, said first plug member and said second plug member defining a stopper; and removing said stopper from said first and second tools;

wherein said providing a first plug member step comprises:

providing a sheet of polymeric material:

providing a lower molding tool defining a molding surface for molding said lower surface of said first plug member, said molding surface defined by said lower molding tool defining a lower molding tool cavity;

placing said sheet of polymeric material over said lower molding tool cavity defined by said lower molding tool;

providing an upper molding tool, said upper molding tool defining a molding surface for molding said upper surface of said first plug member, said molding surface defined by said upper molding tool comprising a central portion, a first leg portion extending radially outwardly and downwardly from the central portion, and a second leg portion extending radially outwardly and upwardly from said first leg portion, said first leg portion and said second leg portion defining a convex portion therebetween for molding said concave portion of said upper surface of said first plug member, said molding surface defined by said upper molding tool defining an upper molding tool cavity, said upper molding tool cavity facing said lower molding tool cavity;

providing relative movement between said upper molding tool and said lower molding tool so as to move said upper molding tool and said lower molding tool toward one another and molding said sheet of polymeric material between said molding surface defined by said upper molding tool and said molding surface defined by said lower molding tool, thereby forming said upper and lower surfaces of said first plug member;

providing relative movement to said upper molding tool and said lower molding tool so as to move said upper molding tool and said lower molding tool away from one another; and removing said first plug member from said upper and lower molding tools.

2. A method for making a stopper in accordance with claim 1, wherein said concave portion of said upper surface of said first plug member is substantially annular.

3. A method for making a stopper in accordance with claim 1, wherein said molding surface of said second tool comprises an upper wall portion and a peripheral wall portion, said hole defined by said second tool being defined through said upper wall portion of said second tool.

4. A method for making a stopper in accordance with claim 1, wherein said sheet of polymeric material comprises a plurality of layers.

5. A method for making a stopper in accordance with claim 4, wherein said sheet of polymeric material comprises a first layer constructed from an inert material, wherein said sheet of polymeric material further comprises a second layer constructed from a polymeric material other than an inert material, and wherein said first layer forms said lower surface of said first plug member and said second layer forms said upper surface of said first plug member.

6. A method for making a stopper in accordance with claim 1, wherein said first plug member comprises a central portion, a first leg portion extending radially outwardly and downwardly from said central portion, and a second leg portion extending radially outwardly and upwardly from said first leg portion, said second leg portion of said first plug member defining an annular shoulder.

7. A method for making a stopper in accordance with claim 1, wherein said hole defined by said second tool is positioned to delivery polymeric material into said concave portion of said upper surface of said first plug member.

8. A method for making a stopper in accordance with claim 7, wherein said second tool defines a plurality of holes therethrough.

9. A method for making a stopper, said method comprising the steps of:

providing a lower molding tool defining a molding surface, said molding surface defining a lower molding tool cavity;

providing a sheet of polymeric material;

placing said sheet of polymeric material over said lower molding tool cavity;

providing an upper molding tool defining a molding surface, said molding surface defining an upper molding tool cavity, said molding surface comprising a central portion, a first leg portion extending radially outwardly and downwardly from said central portion, and a second leg portion extending radially outwardly and upwardly from said first leg portion, whereby said first leg portion and said second leg portion define a convex portion, said lower molding tool and said upper molding tool oriented such that said lower molding tool cavity faces said upper molding tool cavity;

providing relative movement between said upper molding tool and said lower molding tool so as to move said upper molding tool and said lower molding tool toward one another, said molding surface defined by said upper molding tool and said molding surface defined by said lower molding tool molding said sheet of polymeric material therebetween to form a first plug member having an upper surface and a lower surface, said upper surface of said first plug member being shaped by said molding surface defined by said upper molding tool and said lower surface of said first plug member being shaped by said molding surface defined by said lower molding tool, said upper surface of said first plug portion having a concave portion defined by said convex portion of said molding surface defined by said upper molding tool;

providing relative movement to said lower molding tool and said upper molding tool so as to move said upper molding tool and said lower tool away from one another;

providing a third tool defining a molding surface, said molding surface defined by said third tool defining a third tool cavity, said third tool defining a hole therethrough, said hole providing fluid contact between said third tool cavity and a point exterior to said third tool, said third cavity facing said upper surface of said first plug member;

transferring a polymeric material through said hole defined by said third tool into said third cavity defined by said third tool and into said concave portion of said upper surface of said first plug member, said polymeric material forming a second plug member having an upper surface and a lower surface, a shape of said upper surface of said second plug member being defined by said molding surface defined by said third tool, said lower surface of said second plug member being in contact with said upper surface of said first plug member, said first plug member and said second plug member defining a stopper; and removing said stopper from said third tool and said lower molding tool.

10. A method for making a stopper in accordance with claim 9, wherein said sheet of polymeric material comprises a first layer constructed from an inert material and a second layer constructed from a material other than an inert material.

11. A method for making a stopper in accordance with claim 9, wherein said molding surface of said lower molding tool comprises a central portion, a first leg portion extending radially outwardly and downwardly from said central portion, and a second leg portion extending radially outwardly and upwardly from said first leg portion, said second leg portion defining a convex portion therein.

12. A method for making a plug member comprising the steps of:

providing a lower molding tool defining a molding surface, said molding surface defining a lower molding tool cavity, said molding surface comprising a central portion, a first leg portion extending radially outwardly and downwardly from said central portion, and a second leg portion extending radially outwardly and upwardly from said first leg portion, said second leg portion having a concave portion;

providing a sheet of polymeric material;

placing said sheet of polymeric material over said lower molding tool cavity;

providing an upper molding tool defining a molding surface, said upper molding tool comprising a central portion, a first leg portion extending radially outwardly and downwardly from said central portion, and a second leg portion extending radially outwardly and upwardly from said first leg portion, said molding surface defining an upper molding tool cavity, said lower molding tool and said upper molding tool oriented such that said lower molding tool cavity faces said upper molding tool cavity;

providing relative movement between said upper molding tool and said lower molding tool so as to move said upper molding tool and said lower molding tool toward one another, said molding surface defined by said upper molding tool and said molding surface defined by said lower molding tool molding said sheet of polymeric material therebetween to form a first plug member having an upper surface and a lower surface, said upper surface of said first plug member being shaped by said molding surface defined by said upper molding tool and said lower surface of said first plug member being shaped by said molding surface defined by said lower molding tool, said upper surface of said first plug member having a concave portion defined by said first leg portion and said second leg portion of said upper molding tool; and providing relative movement to said lower molding tool and said upper molding tool so as to move said upper molding tool and said lower tool away from one another;

providing a third tool defining a first third cavity;

transferring said first plug member into said third tool cavity such that at least a portion of said lower surface of said first plug member is in contact with said third cavity;

providing a fourth tool defining a molding surface, said molding surface defined by said fourth tool defining a fourth tool cavity, said fourth tool defining a hole therethrough, said hole providing fluid contact between said fourth tool cavity and a point exterior to said fourth tool, said fourth tool oriented such that said fourth tool cavity faces said third tool cavity;

transferring a polymeric material through said hole defined by said fourth tool into said fourth cavity defined by said fourth tool and into said concave portion of said upper surface of said first plug member, said polymeric material forming a second plug member having an upper surface and a lower surface, a shape of said upper surface of said second plug member being defined by said molding surface defined by said fourth tool, a portion of said lower surface of said second plug member being in contact with said upper surface of said first plug member, said first plug member and said second plug member defining a stopper; and removing said stopper from said third and fourth tools.

* * * * *